United States Patent Office 2,909,559
Patented Oct. 20, 1959

2,909,559

POLYMERIC PHOSPHATE ESTERS AND THEIR PRODUCTION

William M. Lanham, Charleston, W. Va., assignor to Union Carbide Corporation, a corporation of New York No Drawing. Application February 3, 1958
Serial No. 712,665

11 Claims. (Cl. 260—461)

This invention relates to a novel class of polymeric phosphate esters, and to a novel process for the production thereof from neutral hydroxyalkyl phosphate diesters of the type represented by the formula

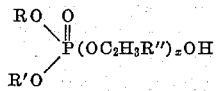

wherein R and R', respectively, designates a radical of the class consisting of the alkyl, haloalkyl, aryl, haloaryl, alkaryl and aralkyl radicals, and preferably those alkyl radicals having 1 to 20 carbon atoms, the halogen-substituted lower alkyl radicals, the unsubstituted, the halogen-substituted and the alkyl-substituted phenyl radicals wherein the alkyl substituent has 1 to 14 carbon atoms, and the benzyl radical; $x$ designates a numerical value from 1 to 10; and R'' designates a radical of the class consisting of hydrogen, and the methyl, ethyl and halomethyl radicals.

The novel polymeric phosphate esters are believed to possess structures designated by the formula

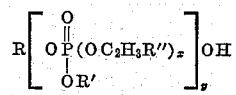

wherein R, R', R'' and $x$ have the meanings hereinbefore described, and $y$ designates a number from 2 to 10. Among such polymeric phosphate esters of the invention are those wherein R and R', respectively, designates a methyl, ethyl, butyl, hexyl, 2-ethylhexyl, octyl, tetradecyl, octadecyl, 2-chloroethyl, 2-chloropropyl, 2,3-dichloropropyl, 2-bromoethyl, 2-fluoroethyl, 4-chlorobutyl, phenyl, p-chlorophenyl, 2,4-dichlorophenyl, p-bromophenyl, cresyl, xylyl, p-tert-butylphenyl, 2,4-(di-tert-butyl)phenyl, 2,4,6-(tri-tert-butyl)phenyl, p-nonylphenyl, p-dodecylphenyl, benzyl or 2-phenylethyl radical, and wherein R and R' can represent the same or a different radical. It is believed that some of the esters have structures indicated by the formula

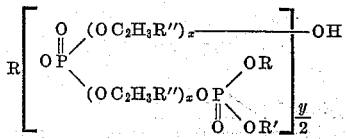

The foregoing novel compounds have a terminal hydroxyl group. This invention also includes polymeric phosphate esters wherein this terminal hydroxyl group is blocked and replaced by an end group such as hereinafter described, in manner to stabilize the polymeric products against further polymerization during production and use, and to modify the solubility and other physical properties of these products, and render them particularly serviceable as lubricity agents, plasticizers, and the like.

The novel polymeric phosphate esters are useful as lubricity agents, especially in gas turbine engine lubricants, as plasticizers for synthetic resins of the polyvinyl acetate and vinyl chloride-vinyl-acetate types, as insecticides, and as flame-proofing agents. By acylating the hydroxyl end groups of these polymeric esters with a carboxylic acid, acid anhydride or the equivalent, compounds are produced which exhibit excellent viscosity-temperature properties, and which are valuable lubricant additives, being soluble in mineral oils, and as hydraulic fluids. While many of the polymeric phosphorus-containing esters of the invention have relatively high viscosities they exhibit unusually low ASTM viscosity indices, improving their utility in many synthetic lubricants. When used in amounts from around 1% to 2.5% of a di-(2-ethylhexyl) sebacate base gas turbine engine lubricant, the polymeric esters usually have little effect on the flash point, pour point, rubber swelling and evaporative properties of the base fluid. The unique characteristics of these polymeric esters as lubricity agents is evidenced by the fact that tri-(p-nonylphenyl) phosphate did not improve the load carrying capacity of the di-(2-ethylhexyl) sebacate gas turbine engine lubricant, in contrast to the results secured when using as little as around 1% to 2.5% of the polymeric phosphate esters of this invention, and especially those derived from ethylene oxide adducts and propylene oxide adducts of di-(alkylphenyl) phosphoric acids having up to 14 carbon atoms in each alkyl radical; and those derived from corresponding adducts of dialkyl and alkyl phenyl phosphoric acids having 8 to 20 carbon atoms in each alkyl radical.

The principal reaction involved in the production of these novel polymeric phosphate esters can be illustrated by the equation:

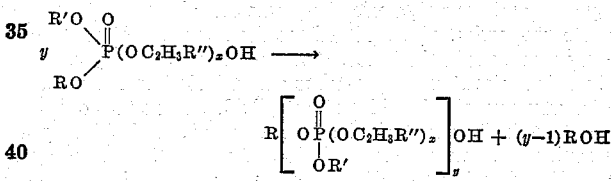

The following reaction is believed also to occur to some degree:

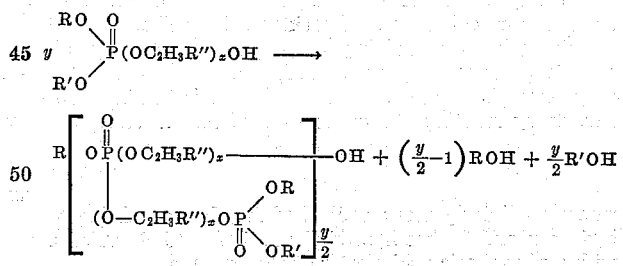

The novel hydroxyl-containing polymeric phosphate esters of the invention are produced by heating a hydroxyl-containing phosphate ester of the aforesaid structure:

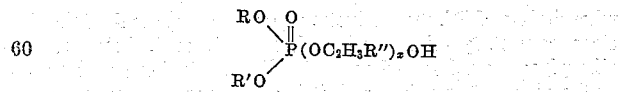

to a temperature within the range from about 90° C. to about 250° C., and preferably around 90° to 150° C., while removing and recovering the by-product alcohol or phenol as formed.

For this purpose it is customary to conduct the reaction under reduced pressures as low as around 0.5 to 1 mm. of mercury until evolution of the alcohol byproduct of the reaction has ceased. The upper temperature limit will depend upon the decomposition temperature of the starting material and that of the polyphosphate product, In runs wherein a low boiling alcohol is being removed (e.g. ethanol) the reaction can be conducted at atmospheric pressure. The reaction proceeds readily without the need for an added catalyst, although the presence of catalytic amounts of acidic catalysts such as boron trifluoride, stannic chloride, and other Friedel-Crafts type catalysts are not objectionable.

In certain instances where the reaction is sluggish and requires a prolonged heating time, or where the starting material is low boiling, it is expedient to use a lower reaction temperature or to use a higher pressure to prevent loss overhead of some unreacted starting material with the byproduct alcohol during the distillation.

The blocked polymeric phosphate esters are readily produced by reacting the hydroxyl-containing polymeric phosphate esters of the invention, such as those of the formula

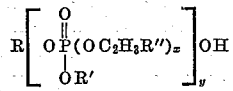

with an aliphatic or an aromatic mono- or polycarboxylic acid or acid anhydride, such as the saturated fatty acids, saturated aliphatic polycarboxylic acids, cycloalkane carboxylic acids, aromatic carboxylic acids, and corresponding halogen-substituted, aryl-substituted, haloaryl-substituted and oxa-substituted carboxylic acids, and the anhydrides of the aforesaid acids. Among such acids are acetic, propionic, butyric, alphamethylbutyric, valeric, pivalic, caproic, capric, stearic, succinic, methylsuccinic, benzoic, toluic, phthalic, cyclobutanecarboxylic, 1,2-cylobutanedicarboxylic, monochloroacetic, 2-bromobutanoic, chlorosuccinic, p-chlorobenzoic, 3-chlorocyclopentanecarboxylic, tetrachlorophthalic, phenylacetic, p-phenylbenzoic, methoxyacetic, o-ethoxybenzoic and 2,4-dichlorophenoxyacetic acids.

In the blocking step it is preferred to use the acid anhydride and the polymeric phosphate ester in the approximate proportion of 2 mols of the former per mol of hydroxyl present in the latter. This reaction is usually conducted at elevated temperatures around 100° to 125° C., and any unreacted acid and anhydride are removed by vacuum distillation or, where necessary or desirable, by washing with an aqueous solution of an alkali metal hydroxide or carbonate. The reaction can be conducted in the presence of a small amount of an acidic esterification catalyst, such as sulfuric or hydrochloric acid, an arylsulfonic acid, boron trifluoride, and the like.

The hydroxyl-containing polyoxyalkyl phosphate diesters used as starting materials in the production of the polymeric phosphate esters can be made in known manner, as by reacting (1) an oxirane of the structure

wherein R'' designates a radical of the class consisting of hydrogen and the methyl, ethyl and halomethyl radicals, with a phosphoric acid diester of the formula

wherein R and R', respectively, represents a radical of the class consisting of the alkyl, haloalkyl, aryl, haloaryl, alkaryl and aralkyl radicals. While equimolar amounts of the reactants can be used, it is advantageous to use an excess of the oxirane compound (usually as much as 100% or more in excess of an equimolar quantity) thereby reducing to a minimum the acidity of the hydroxyalkyl phosphate ester product. The reaction involved is illustrated by the equation:

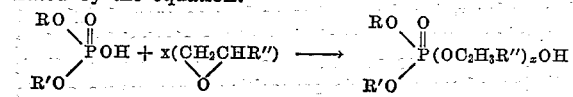

wherein R, R' and R'' have the meanings hereinbefore indicated, and x is a number from 1 to 10 or more. Completion of the reaction is readily determined since the di-substituted phosphoric acids are relatively strong acids. The oxirane compound is added slowly to the phosphate diester, maintained at a reaction temperature of from −20° C. to about 80° C., although a temperature within the range rfom 50° to 70° C. is preferred. Although a catalyst is not required, the reaction can be carried out in the presence of catalytic amounts of acidic catalysts such as boron trifluoride and its ethyl ether complex. After addition of the selected amount of the oxirane is complete it sometimes is desirable to agitate the reaction mixture for an additional 1 to 4 hours, to secure a product of minimum acid content. Any unreacted oxirane can be removed by distillation under vacuum. The residual phosphate ester then is employed for the preparation of the polyphosphate esters of the invention.

When the di-substituted phosphoric acid is a solid it is preferred to conduct the reaction with the oxirane compound in the presence of an organic solvent for such ester which is free from hydroxyl groups and is inert to the reactants and product. Among suitable solvents are the alkyl ethers such as ethyl ether; the paraffinic and aromatic hydrocarbons such as heptane and benzene, and halohydrocarbons such as ethylene dichloride and chlorobenzene.

The polymeric phosphate esters of the invention can be produced directly from the oxirane and di-substituted phosphoric acid by first reacting the same at temperature within the range from −20° C. up to around 80° C. until the exothermic reaction is complete, and then stripping the mixture by distillation at a kettle temperature of around 90° C. to around 150° C. under an absolute pressure of less than 2 mm. of mercury pressure to form the polymeric phosphate ester and eliminate the by-product alcohol or phenol.

Among aliphatic and aromatic phosphate diesters suitable for use in the production of the hydroxyalkyl phosphate ester intermediates are the methyl, ethyl, isopropyl, butyl, hexyl, 2-ethylhexyl, octyl, tetradecyl, octadecyl, 2-chloroethyl, 2-chloropropyl, 2,3-dichloropropyl, 2-bromoethyl, 2-fluoroethyl, 4-chlorobutyl, phenyl, p-chlorophenyl, 2,4-dichlorophenyl, p-bromophenyl, cresyl, xylyl, p-tert-butylphenyl, p-nonylphenyl, p-dodecylphenyl, 2-phenylethyl and benzyl phosphate diesters.

Among oxirane compounds useful in the production of the hydroxy-containing phosphate ester intermediates are ethylene oxide, propylene oxide, 1,2-epoxybutane, epichlorohydrin, and epibromohydrin.

The novel polymeric phosphate esters have recurring

units, with or without recurring

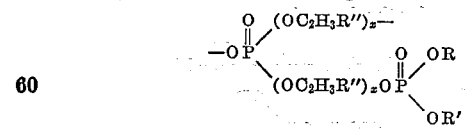

units, as hereinbefore indicated.

The following examples serve to illustrate the invention.

*Example 1*

This example illustrates the production from a simple dialkyl phosphoric acid of polymeric phosphate esters of the invention wherein the terminal hydroxyl group has been blocked.

During two hours, ethylene oxide was diffused into 1100 grams (5.23 mols) of dibutyl phosphoric acid maintained at 70° C. After heating at that temperature for two additional hours, the reaction mixture was stripped by distillation to a kettle temperature of 60° C. under 1 mm. of mercury pressure, leaving a colorless liquid residue, which contained 1.38 mols of ethylene oxide per mol of dibutyl phosphoric acid, and had the following structure:

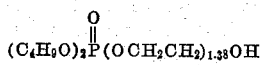

It had the following properties: equivalent weight (by hydroxyl analysis)—265.3 (theory [1]=271.0); percent P=11.36 (theory [1]=11.43); percent C=46.45 (theory [1]= 47.69); percent H=9.36 (theory [1]=9.13). Viscosity at 210° F.=3.00 cs.,[2] at 100° F.=12.33 cs.,[2] at 68° F.= 23.25 cs.[2]

During 13 hours, 1283 grams (4.734 mols of hydroxyl) of the above-mentioned ethylene oxide adduct of dibutyl phosphoric acid was heated at 90° to 130° C. under an absolute pressure of 2 mm. of mercury, 171 grams (2.307 mols) of butanol being removed and recovered. The weight of n-butanol removed indicated that 48.8% of the hydroxyl had been removed. The resultant colorless liquid residue had the following properties: $n_D^{30}$=1.4408; acidity=0.01 cc. of normal KOH/g. It had the following analysis, in percent by weight: percent P=13.07; percent C=44.56; percent H=8.53; percent OH=3.63. Viscosity at 210° F.=5.57 cs.; at 100° F.=28.71 cs.; at 68° F.= 60.62 cs. using an Ostwald-Fenske viscometer; molecular weight (calculated)=459.

The last-named hydroxyl-containing polymeric phosphate ester had the terminal hydroxyl group blocked as follows: a solution consisting of 500 grams (1.09 mol of hydroxyl) of the polymeric phosphate ester formed above upon removal of n-butanol and 224 grams (2.2 mols) of acetic anhydride was heated with agitation for 8 hours at 100°-110° C. The acetic acid and excess acetic anhydride then were removed by distillation at 120° C. under 1 mm. of mercury pressure. The resultant light yellow liquid residue had the following properties: acidity=0.32 cc. of normal KOH/g. $n_D^{30}$=1.4381; viscosity at 210° F.=4.05 cs.; at 100° F.=18.36 cs.; at 68° F.=36.91 cs.; molecular weight (calculated)=501. The product had the following analysis in percent by weight: percent P=12.43; percent C=44.78; percent H= 8.25; percent OH=0.20.

*Example 2*

300 grams of di-(2-ethylhexyl) 2-hydroxyethyl phosphate (0.819 mol of hydroxyl), having a purity of 99.5% by hydroxyl analysis, was heated at a kettle temperature of 140°-152° C. under an absolute pressure of 0.5 mm. of mercury during 28 hours. A total of 94 grams (0.723 mol) of 2-ethylhexanol was removed. The light yellow liquid residue was further stripped at 150° C. under less than 0.2 mm. of mercury pressure, using a falling film type still. The resultant polymeric phosphate ester, secured in 134 gram yield, had the following properties: acidity=0.06 cc. of normal KOH/g.; molecular weight= 1583 (modified Menzies-Wright determination); $n_D^{30}$= 1.4562; sp. gr. at 25/15=1.102. Analysis showed 12.45% of P, and 0.59% of hydroxyl, by weight.

The starting material was prepared by diffusing gaseous ethylene oxide into 500 grams di-(2-ethylhexyl) phosphoric acid at a kettle temperature of 70° C. until there was no longer a heat of reaction. The excess epoxy compound was removed by distillation at 50° C. under 2 mm. of mercury and from the gain in weight it was calculated that 1.216 mols of ethylene oxide had been added per mol of acid. The reaction product was further stripped at 100° C. under 0.2 mm. of mercury using a falling film type still and then was distilled at 150° C. under 0.2 mm. of mercury using the same apparatus. There was obtained 424 grams of distillate which had the following properties: acidity=0.003 cc. of normal KOH/g.; $n_D^{30}$=1.4431; percent purity (by hydroxyl analysis)=99.5. The product had the following structure:

*Example 3*

Upon heating 328 grams (1 mol of hydroxyl) of the ethylene oxide adduct of diphenyl phosphoric acid at a kettle temperature of from 90° to 150° C. under an absolute pressure of 2 mm. of mercury during 10 hours, 100 grams (1.065 mols) of phenol was removed. The resultant polymeric phosphate ester was recovered in 228 grams yield as a light yellow very viscous liquid residue having the following properties: acidity=0.16 cc. of normal KOH/g.; molecular weight=2164 (modified Menzies-Wright determination); viscosity at 210° F.= 162.4 cs.; at 100° F.=5446.5 cs.; and at 68° F.=46731.6 cs. Upon analysis it contained 13.62% of P by weight (theory=13.58, based upon the amount of phenol removed).

The aforesaid ethylene oxide adduct of diphenyl phosphoric acid was made by diffusing ethylene oxide into 332 grams (1.362 mol) of diphenyl phosphoric acid in 500 cc. of ethyl ether held at 25° C. during 1.5 hours. The reaction mixture was held at 25° C. for an additional 2 hours with agitation and then was stripped of unreacted ethylene oxide by distillation at a kettle temperature of 40° C. under less than 1 mm. of mercury. From the net gain in weight (105 grams) of the reaction mixture it was calculated that 1.75 mols of ethylene oxide had reacted per mol of the acid. The residue product, a light yellow liquid, had the following properties: acidity=0.29 cc. of normal KOH/g.; $n_D^{30}$=1.5307; and had the following structure

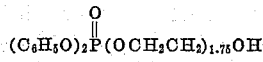

*Example 4*

196 grams (0.4 mol of hydroxyl) of the ethylene oxide adduct of di-(2,4-dichlorophenyl) phosphoric acid having the structure

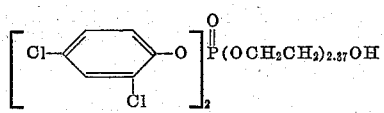

was heated for 3 hours at 110° to 150° C. under 2 mm. mercury pressure, 76 grams of distillate, calculated as 2,4-dichlorophenol, being removed. The residual viscous liquid product (120 grams) had the following properties: acidity=0.17 cc. of normal KOH/g.; $n_D^{30}$=1.5267. It analyzed, in percent by weight: P=9.87 (theory [3]= 10.26; Cl=18.22 (theory [3]=19.52); C=38.95 (theory [3] =38.70); H=4.48 (theory [3]=3.94).

The adduct was prepared by diffusing gaseous ethylene oxide during one hour into an agitated solution of 182 grams (0.47 mol) of di-(2,4-dichlorophenyl) phosphoric acid in 400 cc. of ethyl ether held at 25° C. After three hours further agitation at 25° C. it was stripped by distillation to a kettle temperature of 25° C. under less than 2 mm. mercury pressure. A net gain in weight of 49 grams corresponded to the addition of 2.37 mols of ethylene oxide per mol of the acid.

The polymeric phosphate ester of this example was compatible with a vinyl chloride-vinyl acetate copolymer resin containing around 96% of the chloride, when used in 35% of the total resin composition, upon milling the components for five minutes at 158° C. on a differential 2-roll mill.

*Example 5*

333 grams (0.798 mol of hydroxyl) of the epichloro-

---
[1] Based on the net gain in weight.
[2] Using an Ostwald-Fenske viscometer.
[3] On the basis of dichlorophenol removed.

hydrin adduct of di-(2-ethylhexyl) phosphoric acid was heated for 24 hours at a kettle temperature of 150° C. under an absolute pressure of 0.5 mm. of mercury, 104 grams (0.80 mol) of 2-ethylhexanol being removed, yielding as a clear viscous residue product 229 grams of a polymeric phosphate ester having the properties: acidity =0.52 cc. of normal KOH/g.; $n_D^{30}$=1.4631; sp. gr. at 25/15=1.169; molecular weight=727 (modified Menzies-Wright determination); viscosity at 210° F.=82 cs.; at 100° F.=2525 cs. Analysis, percent by weight: percent P=11.14 (theory [4]=10.78); percent C=45.43 (theory [4]=46.34); percent H=7.81 (theory [4]=7.77); percent Cl=12.05 (theory [4]=12.68).

The above-mentioned adduct was prepared by adding 185 grams (2 mols) of epichlorhydrin during 30 minutes to 322 grams (1 mol) of di-(2-ethylhexyl) phosphoric acid maintained at 50° C. After an additional 4 hours at 50° C. and standing overnight at 25° C. the excess epichlorhydrin was removed by distilling the reaction mixture at 78° C. under 0.2 mm. of mercury, using a falling film type still. 90 grams of epichlorhydrin was recovered from the stripping operation showing that 1.027 mols thereof had added to the one mol of the acid. The residue product, a colorless liquid, had an equivalent weight (by hydroxyl analysis)=430.3 (theory [5]=417.4); $n_D^{30}$=1.4517. It analyzed in percent by weight: percent P=7.75 (theory [5]=7.42); percent Cl=8.62 (theory [5]=8.73).

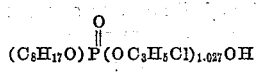

Example 6

Upon heating 200 grams (0.757 mol of hydroxyl) of the ethylene oxide adduct of dibutyl phosphoric acid for 24 hours at a kettle temperature of 150° C. under an absolute pressure of 1.5 mm. of mercury, 57 grams (0.77 mol) of n-butanol was removed, leaving a polymeric phosphate ester in the form of 143 grams of an almost colorless viscous residue having the following properties: acidity=0.13 cc. of normal KOH/g; $n_D^{30}$=1.4521; sp. gr. at 25/15=1.206; molecular weight=1198 (modified Menzies-Wright determination); viscosity at 210° F.=44.7 cs., at 100° F.=462 cs., and at 68° F.=1327 cs. It had the following analysis, in percent by weight: percent P=15.64 (theory [6]=16.39); percent C=40.64 (theory [6]=40.55); percent H=7.79 (theory [6]=7.32).

The aforesaid ethylene oxide adduct was prepared by diffusing 82 grams of ethylene oxide into 195 grams (0.927 mol) of dibutyl phosphoric acid during 45 minutes with agitation while maintaining the mixture at 70° C. then and for an additional 2 hours. The reaction mixture then was stripped of excess ethylene oxide by distillation at 60° C. under less than 2 mm. of mercury. The 245 grams of clear colorless liquid residue had the structure

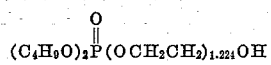

and had the following properties: $n_D^{30}$=1.4341; equivalent weight (by hydroxyl analysis)=263 (theory [7]=264.1); acidity=0.08 cc. of normal KOH/g. The adduct analyzed, in percent by weight: percent P=11.77 (theory [7]=11.71); percent C=46.59 (theory [7]=47.48); percent H=8.80 (theory [7]=9.11).

Example 7

350 grams (0.843 mol of hydroxyl) of the ethylene oxide adduct of di-(2-ethylhexyl) phosphoric acid was heated for 16 hours at a kettle temperature of 150°–156° C. under an absolute pressure of 1 mm. of mercury, 112 grams (0.862 mol) of 2-ethylhexanol being thus removed. The resultant polymeric phosphate ester was recovered in the form of 238 grams of a light yellow slightly viscous liquid having the following properties: $n_D^{30}$=1.4571; sp. gr. at 25/15=1.101; molecular weight=1482 (modified Menzies-Wright determination) viscosity at 210° F.=80 cs., at 100° F.=881 cs., at 68° F.=2640 cs. It analyzed, in percent by weight; percent P=10.71 (theory [8]=10.97); percent C=49.95 (theory [8]=51.21); percent H=8.63 (theory [8]=9.08).

The aforesaid ethylene oxide adduct was prepared by diffusing 88 grams of ethylene oxide into 322 grams (1 mole) of di-(2-ethylhexyl) phosphoric acid at a kettle temperature of 70° C. After removing excess ethylene oxide by distillation of the reaction mixture at 60° C. under less than 2 mm. of mercury the net gain of 54 grams in weight indicated that 1.225 mols of ethylene oxide had reacted. To the residue product was added one gram of boron trifluoride-ethyl ether complex containing 40% of $BF_3$ by weight, and an additional 50 grams of ethylene oxide was diffused into the reaction mixture at a kettle temperature of 70° C. After two additional hours at this temperature the reaction mixture was stripped by distillation at 70° C. under less than 2 mm. of mercury, thereby yielding 415 grams of a light yellow fluid residue of

having the following analysis and properties: percent P=7.37 (theory=7.45); percent C=57.06 (theory=58.44); percent H=10.51 (theory=10.54); acidity=0.07 cc. of normal KOH/g.

Example 8

Upon heating 160 grams (0.517 mol of hydroxyl) of the ethylene oxide adduct of di-(2-chloroethyl) phosphoric acid during 3 hours at a kettle temperature of 150° C. under 1 mm. of mercury pressure, 42 grams (0.52 mol) of ethylene chlorohydrin was removed, leaving as residue product 118 grams of light brown, rubberlike solid residue having the following properties: initial softening point=200° C. analysis, percent by weight: percent P=13.31 (theory [9]=13.56); percent Cl=14.12 (theory [9]=15.51); percent C=31.32 (theory [9]=31.04); percent H=5.50 (theory [9]=5.22).

The aforesaid ethylene oxide adduct was prepared by diffusing gaseous ethylene oxide into 145 grams (0.65 mol) of di-(2-chloroethyl) phosphoric acid, held at a kettle temperature of 50° C. during this time and for an additional 2 hours. A gross gain in weight of 76 grams was obtained. The reaction mixture then was stripped by distillation to a kettle temperature of 50° C. under 1 mm. of mercury pressure, leaving the polymeric phosphate ester in the form of 201 grams of a yellow fluid having the structure

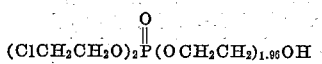

and the following properties: acidity=0.005 cc. of normal KOH/g.; and analysis, percent by weight: percent P=10.11 (theory [10]=10.02); percent Cl=21.34 (theory [10]=22.93); percent OH=4.91 (theory [10]=5.50); percent C=30.94 (theory [10]=30.73); percent H=5.65 (theory [10]=5.44).

Example 9

88 grams (0.23 mol of hydroxyl) of the ethylene oxide adduct of dicresyl phosphoric acid were heated during 8 hours at 150° C. under a pressure of 1 mm. of mercury, during which 30 grams (0.28 mol) of cresol was

---

[4] Based on the amount of 2-ethylhexanol removed.
[5] From the net gain in weight after removing excess epichlorohydrin.
[6] Based upon the amount of n-butanol removed.
[7] Based upon the net gain in weight.
[8] Based upon the amount of 2-ethylhexanol removed.
[9] Based on the amount of ethylene chlorohydrin removed.
[10] Based upon the net gain in weight.

removed. The residual polymeric phosphate ester was recovered in the form of 58 grams of a viscous residue having the following properties: acidity=0.29 cc. of normal KOH/g.; $n_D^{30}$=1.5094; it analyzed in percent by weight: percent P=12.39 (theory [11]=12.52); percent C=47.24 (theory [11]=49.14); percent H=6.41 (theory [11]=5.85).

The aforesaid ethylene oxide adduct was prepared by diffusing ethylene oxide into 100 grams (0.36 mol) of dicresyl phosphoric acid held at 50° C. until 2.21 mols of ethylene oxide had reacted per mol of the acid. The reaction mixture then was stripped by distillation at 50° C. under 1 mm. of mercury pressure. The resultant fluid residue of 135 grams of polymeric phosphate ester had the following structure

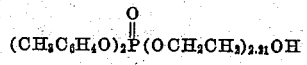
$(CH_3C_6H_4O)_2\overset{O}{\underset{\|}{P}}(OCH_2CH_2)_{2.21}OH$

Example 10

Upon heating 226 grams (0.42 mol of hydroxyl) of the ethylene oxide adduct of di-(2-ethylhexyl) phosphoric acid during 32 hours at a kettle temperature of 150° C. under 1 mm. of mercury pressure, 49 grams (0.377 mol) of 2-ethylhexanol was removed. The residual polymeric phosphate ester was secured in the form of 177 grams of a clear light brown liquid residue having the following properties: acidity=0.31 cc. of normal KOH/g.; $n_D^{30}$=1.4598. It analyzed, in percent by weight: percent P=7.42 (theory [12]=7.40); percent C=51.94 (theory [12]=53.12); percent H=9.22 (theory [12]=9.21); percent OH=1.59.

The aforesaid adduct was prepared by diffusing ethylene oxide into 161 grams (0.5 mol) of di-(2-ethylhexyl) phosphoric acid until there was no longer a heat of reaction. Excess ethylene oxide was removed by distillation at 70° C. under 1 mm. of mercury and 3 grams of boron trifluoride ethyl ether complex previously described was added and ethylene oxide addition was continued until a total of 110 grams of ethylene oxide had been added. The reaction mixture then was stripped at 70° C. under 1 mm. of mercury. The residual product, a light yellow liquid, wherein 4.82 mols of ethylene oxide had been added per mol of acid had the structure

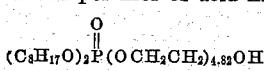
$(C_8H_{17}O)_2\overset{O}{\underset{\|}{P}}(OCH_2CH_2)_{4.82}OH$ and the following properties: acidity=0.16 cc. of normal KOH/g.; $n_D^{30}$=1.4515. It analyzed, in percent by weight, percent P=5.99 (theory [13]=5.79); percent C=54.44 (theory [13]=57.62); percent H=9.85 (theory [13]=10.24).

Example 11

140 grams (0.66 mol of hydroxyl) of the ethylene oxide adduct of dimethyl phosphoric acid was heated during 6 hours at a kettle temperature of 150° C. under a pressure of 1 mm. of mercury, 30 grams of a mixture consisting of 0.593 mol of methanol and 0.052 mol of starting material

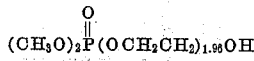
$(CH_3O)_2\overset{O}{\underset{\|}{P}}(OCH_2CH_2)_{1.96}OH$ being removed. The resultant polymeric phosphate ester was recovered in the form of 110 grams of a rubbery gelatinous residue having the following analysis in percent by weight: Percent P=16.83 (theory [14]=17.11); percent C=31.37 (theory [14]=32.74); percent H=6.32 (theory [14]=6.09).

The aforesaid ethylene oxide adduct of dimethyl phosphoric acid was prepared by diffusing ethylene oxide into 95 grams (0.75 mol) of dimethyl phosphoric acid held at a temperature of 50° C. then and for 2 additional hours until 1.96 mols of ethylene oxide had reacted per mol of the dimethyl phosphoric acid. The reaction mixture then was stripped by distillation at 50° C. under 1 mm. of mercury pressure to remove unreacted ethylene oxide, and there was recovered a clear fluid liquid adduct having the structure

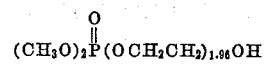
$(CH_3O)_2\overset{O}{\underset{\|}{P}}(OCH_2CH_2)_{1.96}OH$ having the following properties: acidity=0.11 cc. of normal KOH/g.; $n_D^{30}$=1.4371; and the following analysis, in percent by weight: percent P=14.50 (theory [15]=14.58); percent C=33.62 (theory [15]=33.47); percent H=7.08 (theory [15]=7.04).

Example 12

During 36 hours, 337 grams (0.87 mol of hydroxyl) of the propylene oxide adduct of di-(2-ethylhexyl) phosphoric acid were heated at 150° C. under a pressure of 0.5 mm. of mercury, during which time 133 grams of a mixture of 0.113 mol of the starting material and 0.69 mol of 2-ethylhexanol was removed and recovered in the cold traps. The resultant polymeric phosphate ester was recovered in the form of a light brown liquid having $n_D^{30}$=1.4472.

It had the following analysis, in percent by weight: percent P=11.99 (theory [16]=11.52; percent C=53.22 (theory [16]=53.90); percent H=9.43 (theory [16]=9.50).

The propylene oxide adduct of di-(2-ethylhexyl) phosphoric acid was prepared by adding 116 grams (2.0 mols) of propylene oxide during 30 minutes to 322 grams (1.0 mol) of di-(2-ethylhexyl) phosphoric acid with agitation thereof, while maintaining the mixture at 50° C. during this time and for another two hours. The reaction mixture was stripped of unreacted propylene oxide by distillation at 50° C. under 1 mm. of mercury pressure, leaving the said adduct as a liquid having the following properties: equivalent weight (by hydroxyl analysis)=390.9 (theory [17]=386.4). Analysis, percent by weight: P=8.15 (theory [17]=8.02); $n_D^{30}$=1.4420.

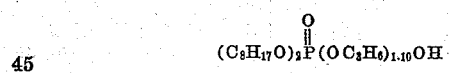
$(C_8H_{17}O)_2\overset{O}{\underset{\|}{P}}(OC_3H_6)_{1.10}OH$

Example 13

245 grams (0.43 mol of hydroxyl) of the ethylene oxide adduct of di-(p-nonylphenyl) phosphoric acid were heated during eight hours at 150° C. under a pressure of 1 mm. of mercury. The reaction mixture was freed of p-nonylphenol by stripping at 150° C. under 0.2 mm. mercury, using a falling film type still. A total of 93 grams (0.422 mol) of p-nonylphenol was removed. The residual polymeric phosphate ester was recovered in the form of a very viscous residue having the following properties: acidity=0.22 cc. of normal KOH/g.; $n_D^{30}$=1.5090. It analyzed, in percent by weight: P=8.34 (theory [18]=8.78; C=63.18 (theory [19]=62.30); H=8.58 (theory [19]=8.36).

The aforesaid ethylene oxide adduct was prepared by diffusing ethylene oxide into 243 grams (0.484 mol) of di-(p-nonylphenyl) phosphoric acid in 200 cc. of ethyl ether held at 25° C. during one hour. The reaction mixture, after additional agitation for 2.5 hours at 25° C. and standing overnight at 25° C. was stripped by pot distillation at 25° C. under 1 mm. of mercury pressure. The resultant adduct, in the form of a viscous residue corresponded to the adduct of 1.50 mols of ethylene oxide per mol of the said acid, and had a phosphorus content of 5.50% by weight.

---

[11] Based on the amount of cresol removed.
[12] Based on the amount of 2-ethylhexanol removed.
[13] Calculated from the net gain in weight after stripping unreacted ethylene oxide.
[14] Based upon the total amount of methanol and starting material removed.
[15] From the net gain in weight.
[16] Based upon the amounts of 2-ethylhexanol and starting material removed.
[17] From the net gain in weight.
[18,19] Based upon the amount of p-nonylphenol removed.

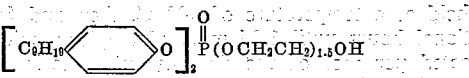

$$\left[C_6H_{10}\diagup\diagdown O\right]_2 \overset{O}{\underset{\|}{P}}(OCH_2CH_2)_{1.5}OH$$

The polymeric phosphate ester of this example has shown excellent value as a lubricity agent in gas turbine engine lubricants, imparting exceptional load-carrying properties to such lubricants as di-(2-ethylhexyl) sebacate in amounts around 1% to 2.5% of the composition.

*Example 14*

Upon heating 454 grams (1.24 mol of hydroxyl) of the propylene oxide adduct of 2-ethylhexyl phenyl phosphoric acid during six hours at a kettle temperature of 150° C. under a pressure of less than 1 mm. mercury, 84 grams of phenol and 25 grams of 2-ethylhexanol were removed. The residual polymeric phosphate ester was secured in the form of 345 grams of a clear, dark yellow, slightly viscous residue having the following properties: acidity=0.02 cc. of normal KOH per gram; $n_D^{30}$=1.4567; it had the following analysis, in percent by weight: P= 11.08 (theory [20]=11.14) C=54.12 (theory [20]=54.28) H=8.82 (theory [20]=8.75).

The aforesaid propylene oxide adduct was prepared by adding 232 grams (4 mols) of propylene oxide during 35 minutes to 400 grams (1.4 mols) of 2-ethylhexyl phenyl phosphoric acid held at 25° C. After four additional hours with agitation at 25° C. the reaction mixture was stripped by pot distillation at 25° C. under less than 2 mm. of mercury, yielding the said adduct as a clear dark yellow liquid having a phosphorus content of 8.33% by weight. The net gain in weight indicated that 1.37 mols of propylene oxide had reacted per mol of the acid.

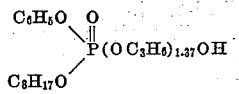

$$\begin{array}{c}C_6H_5O\\C_8H_{17}O\end{array}\!\!\diagdown\!\!\overset{O}{\underset{\|}{P}}(OC_3H_6)_{1.37}OH$$

The polymeric phosphate ester of this example provided exceptional load carrying ability when used as a lubricity agent in gas turbine engine lubricants employing diester base fluids such as di-(2-ethylhexyl) sebacate, with as little as 0.75% of the said polymer preventing scoring in the SAE test with loadings up to 300 pounds.

A plasticized composition consisting of 64.5% of a commercial vinyl chloride-vinyl acetate copolymer resin containing around 96% of the chloride, 35% of the polymeric phosphate ester of this example, and 0.5% of dibutyltin maleate as stabilizer was prepared by milling the said components for five minutes at 158° C. on a differential 2-roll mill.

*Example 15*

While heating 675 grams (1.71 mol of hydroxyl) of the ethylene oxide adduct of dixylyl phosphoric acid during 5.5 hours at a kettle temperature of 150° C. under less than 1 mm. of mercury pressure, 195 grams (1.6 mols) of xylenol were removed. The residual polymeric phosphate ester was secured in the form of 480 grams of a brown viscous benzene-insoluble liquid residue having the following properties: acidity=0.40 cc. normal KOH per gram; and the following analysis, in percent by weight: P=10.53 (theory [21]=11.04) C=54.28 (theory [21]=53.75); H=6.48 (theory [21]=6.36).

The aforesaid ethylene oxide adduct was prepared by diffusing gaseous ethylene oxide into 617 grams (2 mols) of dixylyl phosphoric acid with agitation at a reaction temperature of 50° C. during 65 minutes—a gross gain in weight of 264 grams being obtained. After heating the reaction mixture an additional 2.5 hours at 50° C., and stripping the reaction mixture by pot distillation at 50° C. under less than 1.5 mm. of mercury pressure, there was obtained the polymeric phosphate ester in the form of a brown fluid residue having an acidity of 0.19 cc. of normal KOH per gram; and the following analysis, in percent by weight: P=7.49 (theory [22]=7.85); C=60.67) theory [22]=60.92); H=7.00 (theory [22]=6.90).

*Example 16*

215 grams (0.448 mol of hydroxyl) of the ethylene oxide adduct of di-(p-tert-butylphenyl) phosphoric acid was heated for 4 hours at a kettle temperature of 150° C. under an absolute pressure of less than 2 mm. of mercury, and 89 grams (0.592 mol) of p-tert-butylphenol were removed. The residual polymeric phosphate ester was obtained in the form of 126 grams of a clear light yellow, spongy, benzene-insoluble solid which analyzed, in percent by weight: P=10.27 (theory [23]=11.24); C=52.12 (theory [23]=51.64); H=6.93 (theory [23]=6.86).

The aforesaid ethylene oxide adduct of di-(p-tert-butylphenyl) phosphoric acid was prepared by diffusing gaseous ethylene oxide into 181 grams (0.5 mol) of di-(p-tert-butylphenyl) phosphoric acid in 400 cc. of ethyl ether maintained at 25° C. during 70 minutes. After agitating the reaction mixture for an additional 3 hours at 25° C. it was stripped by distillation at 25° C. under less than 2 mm. of mercury pressure. The resultant clear light yellow viscous residue product (240 grams) had an acidity=0.02 cc. of normal KOH per gram; and had a structure corresponding to the following formula:

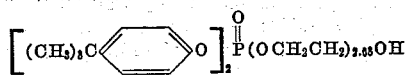

$$\left[(CH_3)_3C\diagup\diagdown O\right]_2 \overset{O}{\underset{\|}{P}}(OCH_2CH_2)_{2.68}OH$$

This application is a continuation-in-part of my pending application Serial No. 513,592, filed June 6, 1955.

What is claimed is:

1. As new products, condensed polyphosphate esters produced by a process comprising heating at a temperature within the range from about 90° C. to about 250° C. an hydroxyl-containing phosphate ester having the structure

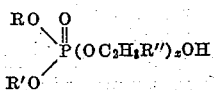

$$\begin{array}{c}RO\\R'O\end{array}\!\!\diagdown\!\!\overset{O}{\underset{\|}{P}}(OC_2H_3R'')_xOH$$

wherein R and R', respectively, are members of the class consisting of the alkyl radicals having 1 to 20 carbon atoms, the halogen-substituted lower alkyl radicals, the unsubstituted and the halogen-substituted phenyl radicals, the alkyl-substituted phenyl radicals wherein the alkyl substituent has from 1 to 14 carbon atoms, and the benzyl radical; R″ is a member of the class consisting of hydrogen and the methyl, ethyl and halomethyl radicals; and x is a numerical value from 1 to 10, and removing as formed in the reaction at least one member of the class consisting of alcohols of the formulae ROH and R'OH.

2. As new products, condensed polyphosphate esters produced by a process which comprises heating at a temperature within the range from about 90° C. to about 250° C. an hydroxyl-containing phosphate ester having the formula

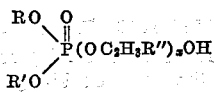

$$\begin{array}{c}RO\\R'O\end{array}\!\!\diagdown\!\!\overset{O}{\underset{\|}{P}}(OC_2H_3R'')_xOH$$

wherein R and R', respectively, are alkyl radicals having 1 to 20 carbon atoms; R″ is a member of the class consisting of hydrogen and the methyl, ethyl, and halomethyl radicals; and x is a numerical value from 1 to 10, and removing as formed in the reaction at least one member of the class consisting of alcohols of the formulae ROH and R'OH.

3. As new products, condensed polyphosphate esters

---

[20] Based on the amount of phenol and 2-ethylhexanol removed.
[21] Based on the amount of xylenol removed.
[22] From the net gain in weight, which indicated that 2.01 mols of ethylene oxide had reacted per mole of the said acid.
[23] Based upon the amount of p-tert-butylphenol removed.

produced by a process which comprises heating at a temperature within the range from about 90° C. to about 250° C. an hydroxyl-containing phosphate ester having the formula

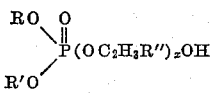

wherein R and R' respectively represent an alkylphenyl radical having from 1 to 14 carbon atoms in the alkyl substituent; R" is a member of the class consisting of hydrogen and the methyl, ethyl, and halomethyl radicals; and $x$ is a numerical value from 1 to 10, and removing as formed in the reaction at least one member of the class consisting of alcohols of the formulae ROH and R'OH.

4. As new products, condensed polyphosphate esters produced by a process which comprises heating at a temperature within the range from about 90° C. to about 250° C. an hydroxyl-containing phosphate ester having the formula

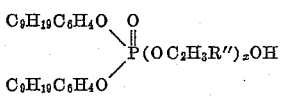

wherein R" is a member of the class consisting of hydrogen and the methyl, ethyl and halomethyl radicals; and $x$ is a numerical value from 1 to 10, and removing nonylphenol as formed in the reaction.

5. As new products, condensed polyphosphate esters produced by a process which comprises heating at a temperature within the range from about 90° C. to about 250° C. an hydroxyl-containing phosphate ester having the formula

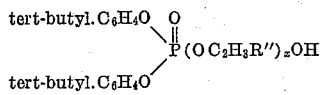

wherein R" is a member of the class consisting of hydrogen and the methyl, ethyl and halomethyl radicals; and $x$ is a numerical value from 1 to 10, and removing the tert.butylphenol as formed in the reaction.

6. As new products, condensed polyphosphate esters produced by a process which comprises heating at a temperature within the range from about 90° C. to about 250° C. an hydroxyl-containing phosphate ester having the formula

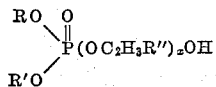

wherein R represents an alkyl radical having 1 to 20 carbon atoms; R' represents a phenyl radical; and R" is a member of the class consisting of hydrogen and the methyl, ethyl and halomethyl radicals; and $x$ is a numerical value from 1 to 10, and removing as formed in the reaction at least one member of the class consisting of alcohols of the formulae ROH and R'OH.

7. As new products, condensed polyphosphate esters produced by a process which comprises heating at a temperature within the range from about 90° C. to about 250° C. an hydroxyl-containing phosphate ester having the formula

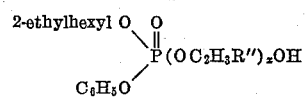

wherein R" is a member of the class consisting of hydrogen and the methyl, ethyl, and halomethyl radicals; and $x$ is a numerical value from 1 to 10, and removing as formed in the reaction at least one member of the class consisting of 2-ethylhexanol and phenol.

8. Process for producing condensed polyphosphate esters, which comprises heating at a temperature within the range from around 90° C. to around 250° C. an hydroxyl-containing phosphate ester having the structure

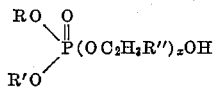

wherein R and R', respectively, are radicals of the class consisting of the alkyl radicals having 1 to 20 carbon atoms, the halogen-substituted lower alkyl radicals, the unsubstituted and the halogen-substituted phenyl radicals, the alkyl-substituted phenyl radicals wherein the alkyl substituent has from 1 to 14 carbon atoms, and the benzyl radical; R" is a radical of the class consisting of hydrogen and the methyl, ethyl and halomethyl radicals; and $x$ is a numerical value from 1 to 10; and removing an alcohol of the formula ROH as it is formed in the resultant reaction.

9. Process as defined in claim 8 wherein the reaction is conducted under vacuum.

10. Process as defined in claim 8 wherein the alcohol of the formula ROH released during the reaction is removed under an absolute pressure of not more than 2 mm. of mercury.

11. Process for producing blocked condensed polyphosphate esters resistant to further condensation, which comprises heating at a temperature within the range from around 90° C. to around 250° C. an hydroxyl-containing phosphate ester having the structure

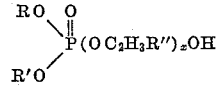

wherein R and R', respectively, are radicals of the class consisting of the alkyl radicals having 1 to 20 carbon atoms, the halogen-substituted lower alkyl radicals, the unsubstituted and the halogen-substituted phenyl radicals, the alkyl-substituted phenyl radicals wherein the alkyl substituent has from 1 to 14 carbon atoms, and the benzyl radical; R" is a radical of the class consisting of hydrogen and the methyl, ethyl and halomethyl radicals; and $x$ is a numerical value from 1 to 10, removing at least one member of the class consisting of alcohols of the respective formulae ROH and R'OH as formed in the resultant reaction, reacting the resultant hydroxyl-containing polyphosphate ester at elevated temperatures with a compound selected from the class consisting of the carboxylic acids and the carboxylic acid anhydrides, and removing excess carboxylic acid from the resultant blocked product.

No references cited.